(12) United States Patent
Okazaki et al.

(10) Patent No.: US 11,242,069 B2
(45) Date of Patent: Feb. 8, 2022

(54) GRIP SENSOR, STEERING WHEEL, AND VEHICLE

(71) Applicant: Panasonic Intellectual Property Management Co., Ltd., Osaka (JP)

(72) Inventors: Yuta Okazaki, Kagoshima (JP); Youichi Kurosawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 16/559,659

(22) Filed: Sep. 4, 2019

(65) Prior Publication Data
US 2019/0389489 A1 Dec. 26, 2019

Related U.S. Application Data

(63) Continuation of application No. PCT/JP2018/006342, filed on Feb. 22, 2018.

(30) Foreign Application Priority Data

Mar. 13, 2017 (JP) .............................. JP2017-047752

(51) Int. Cl.
*B60W 50/14* (2020.01)
*B62D 1/06* (2006.01)

(52) U.S. Cl.
CPC ............... *B60W 50/14* (2013.01); *B62D 1/06* (2013.01); *B60K 2370/782* (2019.05); *B60W 2050/146* (2013.01); *B60W 2540/18* (2013.01)

(58) Field of Classification Search
CPC ....... B60W 2540/18; B60W 2050/146; B60W 50/14; B60K 2370/782; B62D 1/06
See application file for complete search history.

(56) References Cited

U.S. PATENT DOCUMENTS

2002/0170900 A1* 11/2002 Braeuchle ............ B62D 51/002
219/204
2004/0267422 A1* 12/2004 Bossler ............. B60R 21/01552
701/41

(Continued)

FOREIGN PATENT DOCUMENTS

DE 20309603 U1 9/2003
DE 20309877 U1 10/2003

(Continued)

OTHER PUBLICATIONS

International Search Report of PCT application No. PCT/JP2018/006342 dated Apr. 24, 2018.

(Continued)

*Primary Examiner* — Peter D Nolan
*Assistant Examiner* — Wae L Louie
(74) *Attorney, Agent, or Firm* — Greenblum & Bernstein, P.L.C.

(57) ABSTRACT

Grip sensor includes base material, sensor wire formed on base material, and sensor circuit electrically connected to an end of sensor wire. Sensor wire includes first wire portion on a side of sensor end, and a second wire portion on a side of power source end. In a state where base material is attached on a rim, second wire portion is disposed at an outer peripheral surface of the rim that is a site opposing a knee or thigh of a driver operating a steering wheel, and first wire portion is disposed at a front side and a rear side of the rim.

8 Claims, 9 Drawing Sheets

(56) References Cited

U.S. PATENT DOCUMENTS

| | | | |
|---|---|---|---|
| 2009/0308857 A1* | 12/2009 | Asami | B62D 1/065 |
| | | | 219/204 |
| 2015/0330931 A1* | 11/2015 | Fujikawa | H03K 17/9622 |
| | | | 324/663 |
| 2017/0183025 A1* | 6/2017 | Okazaki | B62D 1/06 |
| 2017/0210408 A1* | 7/2017 | Okazaki | B62D 1/046 |
| 2017/0212633 A1* | 7/2017 | You | G06F 3/04883 |
| 2020/0239060 A1* | 7/2020 | Hyoudou | B62D 1/065 |
| 2021/0061355 A1* | 3/2021 | Okayama | B62D 1/04 |

FOREIGN PATENT DOCUMENTS

| | | |
|---|---|---|
| JP | 2002-340712 | 11/2002 |
| JP | 2011-121477 | 6/2011 |
| JP | 2015-229417 | 12/2015 |
| WO | 2016/009584 A1 | 1/2016 |
| WO | 2016/013180 | 1/2016 |

OTHER PUBLICATIONS

Notice of Reasons for Refusal of Japanese Patent Application No. 2017-047752 dated Jul. 23, 2019.
German Office Action dated Jun. 2, 2020 from the German Patent and Trademark Office for the related German Patent Application No. 112018000601.8, together with an English language translation.

\* cited by examiner

GRIP SENSOR, STEERING WHEEL, AND VEHICLE

CROSS-REFERENCE TO RELATED APPLICATIONS

This application is a continuation of the PCT International Application No. PCT/JP2018/006342 filed on Feb. 22, 2018, which claims the benefit of foreign priority of Japanese patent application No. 2017-047752 filed on Mar. 13, 2017, the contents all of which are incorporated herein by reference.

TECHNICAL FIELD

The present invention relates to a grip sensor for detecting a grip of, for example, a steering wheel of a vehicle or the like.

BACKGROUND ART

Conventionally, a grip sensor for detecting a grip of a steering wheel of a vehicle has been proposed (see, PTL 1).

CITATION LIST

Patent Literature

PTL 1: Unexamined Japanese Patent Publication No. 2002-340712

SUMMARY OF THE INVENTION

The present invention provides a grip sensor that suppresses false detection.

A grip sensor according to an aspect of the present invention includes a base material, a sensor wire, and a sensor circuit. The base material is attached on a rim of a steering wheel. The sensor wire is disposed on the base material, and includes a first end and a second end positioned to oppose the first end. The sensor circuit is electrically connected to the first end of the sensor wire. The sensor wire includes a first wire portion and a second wire portion positioned in a direction of the second end with respect to the first wire portion. In a state where the steering wheel is attached to a vehicle and a steering angle of the steering wheel is neutral, the second wire portion is disposed at a seat surface opposing portion of the rim nearer than a seat surface of a seat of the vehicle than the first wire portion. The first wire portion is disposed at a non-opposing portion that is a site of the rim other than the seat surface opposing portion.

These comprehensive or specific aspects may be realized by any combination of a system, a method, and an integrated circuit.

The present invention provides a grip sensor that suppresses false detection.

Figure 1:
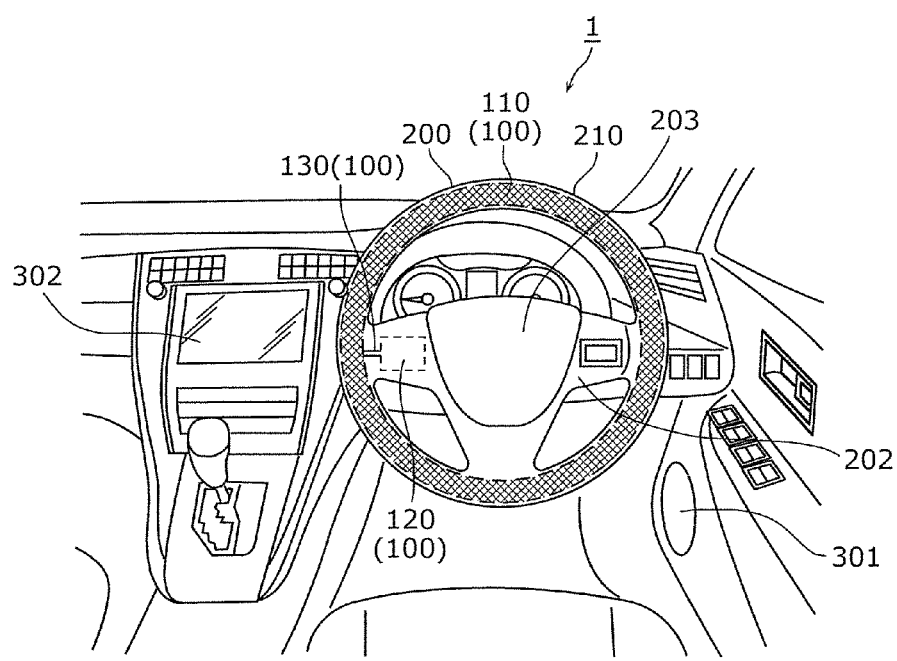
FIG. 1 is a diagram illustrating an example of a vehicle room of a vehicle in which a grip sensor according to an exemplary embodiment is disposed.

DESCRIPTION OF EMBODIMENT (Knowledge Underlying the Present Invention)

The inventor of the present invention has found that the following problem arises in a grip sensor described in the section of "BACKGROUND ART".

For example, the grip sensor includes a base material, and a sensor wire provided on the grip sensor. The base material on which such a sensor wire is disposed is wound around, for example, a steering wheel.

However, in a normal passenger vehicle, an outer peripheral surface positioned at a lower portion of the steering wheel is opposed to a knee or thigh of a driver operating the steering wheel. This changes capacitance of the sensor wire due to approach of a knee of thigh of the driver to the above-mentioned outer peripheral surface, which can cause the grip sensor to detect grip even though the driver does not grip the steering wheel.

In order to solve such a problem, a grip sensor according to an aspect of the present invention includes a base material, a sensor wire, and a sensor circuit. The base material is attached on a rim of the steering wheel. The sensor wire is disposed on the base material and includes a first end and a second end positioned to oppose the first end. The sensor circuit is electrically connected to the first end of the sensor wire. The sensor wire includes a first wire portion and a second wire portion positioned on a direction of the second end with respect to the first wire portion. In a state where the steering wheel is attached to a vehicle and a steering angle of the steering wheel is neutral, the second wire portion is disposed at a seat surface opposing portion of the rim closer to a seat surface of a seat of the vehicle than the first wire portion is. The first wire portion is disposed at a non-opposing portion that is a site of the rim other than the seat surface opposing portion. Herein, in a case where the vehicle having the steering wheel is, for example, a passenger vehicle, the seat surface opposing portion may be disposed on an outer peripheral surface positioned on an outermost side of the rim in a direction from a rotational center of the steering wheel toward sides of the rim, and the non-opposing portion may include the front side and rear side of the rim. Alternatively, in a case where the vehicle having the steering wheel is, for example, a large vehicle such as a bus, the seat surface opposing portion may be disposed on the rear side of the rim, and the non-opposing portion may include the front side of the rim and an outer peripheral surface positioned on an outermost side of the rim in a direction from a rotational center of the steering wheel toward sides of the rim. Alternatively, the second wire portion may be disposed at the seat surface opposing portion in the state where the steering wheel is neutral across an outer circumference of cross-section parallel to a rotational axis of the steering wheel of the rim.

This makes the second wire portion far from the sensor circuit in electrical connection route be disposed at the seat surface opposing portion of the rim of the steering wheel, making it possible to lower detection sensitivity of grip at the seat surface opposing portion than detection sensitivity at the non-opposing portion of the rim. This enables to suppress that a grip of the steering wheel by a driver is falsely detected when a knee of thigh of the driver comes close to the seat surface opposing portion of the rim.

Each of the first wire portion and the second wire portion may be disposed on the base material in a zigzag manner.

The grip sensor may further include a power source unit that is electrically connected to the second end of the sensor wire and that heats the sensor wire by making current flow in the sensor wire.

This enables the grip sensor to also have a function as a heater, which eliminates, for example, to newly attach a heater to the steering wheel, making it possible to simplify configuration.

A steering wheel according to an aspect of the present invention includes the above-mentioned grip sensor. A vehicle according to an aspect of the present invention includes the above-mentioned steering wheel.

Hereinafter, an exemplary embodiment will be specifically described with reference to the drawings.

Note that the following exemplary embodiment indicates comprehensive or specific examples. Numerical values, shapes, materials, constituent elements, arrangement positions and connection modes of the constituent elements, steps, and order of the steps and the like illustrated in the following exemplary embodiment are examples, and therefore are not intended to limit the present invention. Among the constituent elements in the following exemplary embodiment, constituent elements which are not described in the independent claims showing the top level concept are described as arbitrary constituent elements.

Furthermore, each drawing is schematic, and is not necessarily illustrated precisely. In each diagram, the same components are denoted by the same reference marks. In the following exemplary embodiment, description will be made using substantially central portion or substantially constant width. For example, substantially the same denotes not only perfectly the same, but also denotes substantially the same. That is, substantially the same also includes an error of about, for example, several %. The same applies to other expression using "substantially".

Exemplary Embodiment

FIG. 1 is a diagram illustrating an example of a vehicle room of a vehicle in which a grip sensor according to the exemplary embodiment is disposed.

Vehicle 1 includes steering wheel 200, speaker 301, and display device 302 such as a liquid crystal display. Speaker 301 and display device 302 are configured as, for example, an attention calling device.

Steering wheel 200 is used for steering vehicle 1. Steering wheel 200 includes rim 210 having a ring shape, substantially T-shaped spoke 202 integrally formed on an inner peripheral surface of rim 210, and horn switch cover 203 covering a horn switch (not illustrated) disposed at a center of spoke 202.

Grip sensor 100 is a device for detecting a grip of steering wheel 200 by a hand, and equipped in steering wheel 200 of vehicle 1 as illustrated in FIG. 1. Specifically, grip sensor 100 includes sensor 110 embedded in rim 210 of steering wheel 200, control circuit unit 120 for detecting grip on the basis of a signal from sensor 110, and harness 130 for electrically connecting sensor 110 and control circuit unit 120. Control circuit unit 120 is embedded in, for example, spoke 202. Such grip sensor 100 detects a grip of rim 210 of steering wheel 200.

In sensor 110, a measured capacitance changes depending on whether a driver of vehicle 1 grips rim 210 of steering wheel 200. Control circuit unit 120 measures the capacitance of sensor 110 or a value (an amount of change) depending on the capacitance, and detects the grip of rim 210 by the hand of the driver on the basis of the value. In a case where no grip is detected even though vehicle 1 is driven, control circuit unit 120 lets an attention calling device execute an attention calling to the driver. For example, speaker 301 serving as the attention calling device calls attention to the driver by warning sound or voice. Display device 302 displays an attention calling message that promotes the driver to firmly hold steering wheel 200. This enables to reduce traffic accident.

Figure 2:
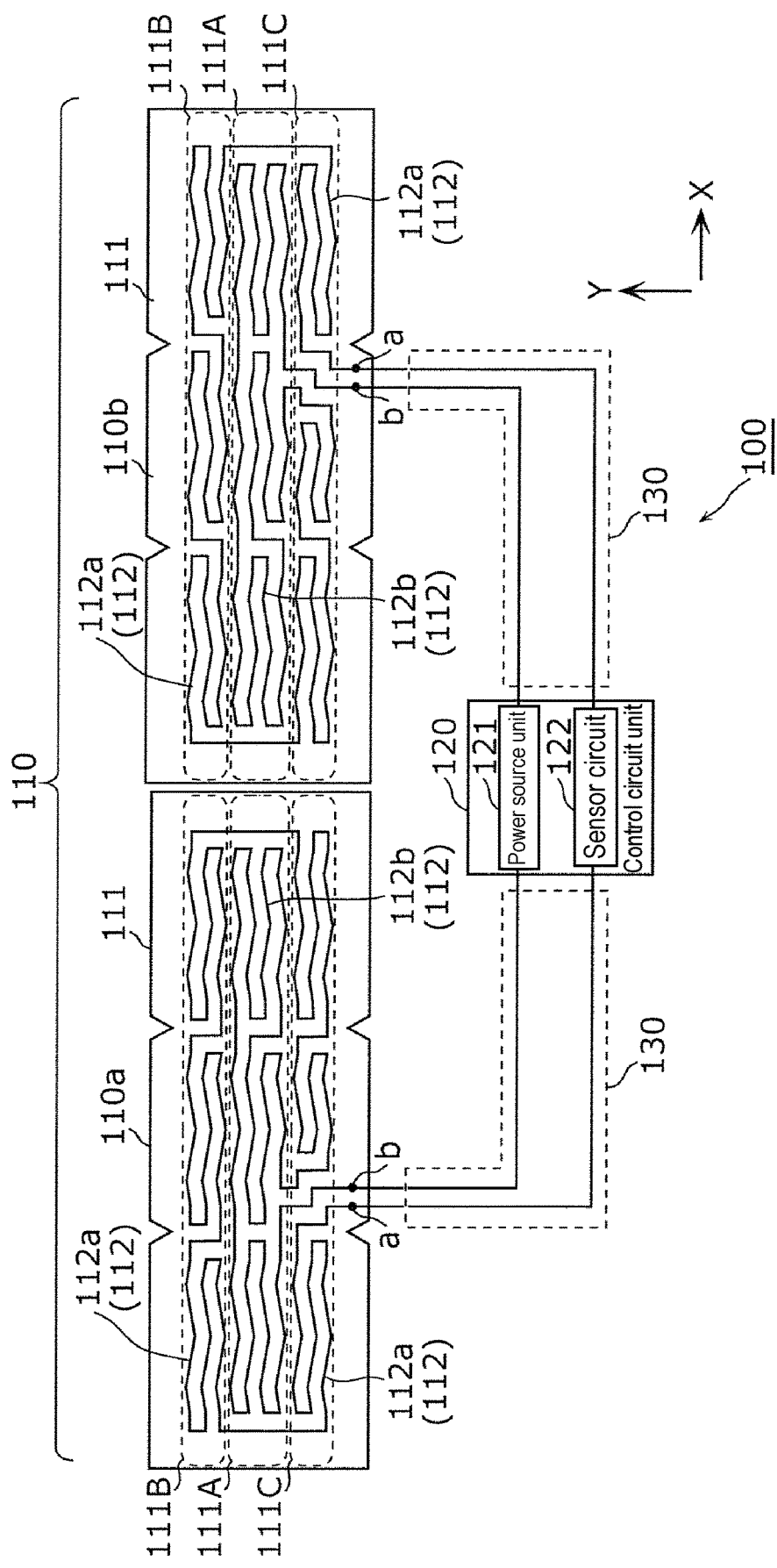
FIG. 2 is a diagram illustrating a configuration example of the grip sensor according to the exemplary embodiment.

FIG. 2 is a diagram illustrating a configuration example of grip sensor 100 according to the exemplary embodiment.

As described above, grip sensor 100 includes sensor 110, control circuit unit 120, and harness 130. Sensor 110 is equipped with first sensor 110a and second sensor 110b each being formed of base material 111 and sensor wire 112. Note that, in the exemplary embodiment, first sensor 110a and second sensor 110b are formed in a line symmetry with a straight line along a Y-axis direction (see following definition of X-axis and Y-axis) as a symmetry axis, and have substantially same configuration.

Base material 111 is, for example, formed of a nonwoven cloth, formed into a long shape, and holds sensor wire 112. Base material 111 is attached to rim 210 of steering wheel 200. Note that in the exemplary embodiment, a longitudinal direction of base material 111 is referred to as an X-axis direction, and a direction perpendicular to the X-axis direction is referred to as a Y-axis direction in a plane parallel to base material 111. One end side (a lower end side in FIG. 2) of base material 111 in the Y-axis direction is referred to as a negative-side, and the other end side (an upper end side in FIG. 2) of base material 111 in the Y-axis direction is referred to as a positive-side. Likewise, one end side (a left end side in FIG. 2) of base material 111 in the X-axis direction is referred to as a negative-side, and the other end side (a right end side in FIG. 2) of base material 111 in the X-axis direction is referred to as a positive-side.

Sensor wire 112 is a metal wire (e.g., a copper wire), and is sewn on a surface of base material 111 with a yarn not shown to form a pattern having a zigzag shape. A sensor end a (first end) that is an end of sensor wire 112, and power source end b that is another end (second end) of sensor wire 112 are connected to control circuit unit 120 via harness 130.

Sensor wire 112 is formed on base material 111. Such sensor wire 112 includes first wire portion 112a on a side of sensor end a, and second wire portion 112b on a side of power source end b. Each of first wire portion 112a and second wire portion 112b are formed on base material 111 to have a zigzag shape. Although sensor wire 112 is sewn on a surface of base material 111 with a yarn not shown, sensor wire 112 may be fixed to base material 111 by a thermocompression bonding or the like. Also, sensor wire 112 may have a plane shape formed of a conductor or a resistor. A detail of the shape and arrangement of sensor wire 112 formed of first wire portion 112a and second wire portion 112b will be described below.

Control circuit unit 120 includes sensor circuit 122 electrically connected to sensor end a that is one end of sensor wire 112, and power source unit 121 electrically connected to power source end b that is another end of sensor wire 112. That is, sensor circuit 122 is connected to sensor end a of sensor wire 112 of first sensor 110a, and sensor end a of sensor wire 112 of second sensor 110b. Power source unit 121 is connected to power source end b of sensor wire 112 of first sensor 110a, and sensor end b of sensor wire 112 of second sensor 110b.

Power source unit 121 heats sensor wire 112 by causing current to flow in sensor wire 112 in each of first sensor 110a and second sensor 110b. This enables to heat rim 210 of steering wheel 200. Note that, sensor end a is connected to ground via, for example, an inductor so that current flows in sensor wire 112 from power source unit 121.

Sensor circuit 122 causes AC to flow in sensor wire 112 via sensor ends a in first sensor 110a and second sensor 110b. Sensor circuit 122 detects change of capacitance of sensor wire 112 on the basis of current value of current flowing in sensor wire 112.

Figure 3:
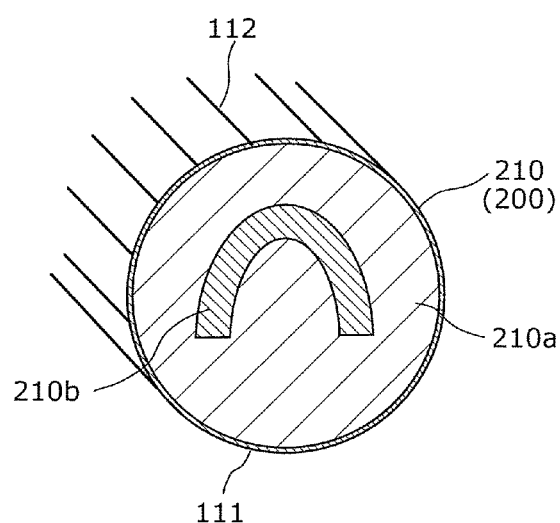
FIG. 3 is a diagram illustrating an example of a cross-section of a rim on which a sensor according to the exemplary embodiment is attached.

FIG. 3 is a diagram illustrating an example of a cross-section parallel to a rotational axis of the above-mentioned steering wheel of rim 210 to which sensor 110 is attached.

Rim 210 includes metallic core 210b that is an annular core made of a metal, and resin layer 210a formed of a urethane resin covering metallic core 210b.

Base material 111 on which sensor wire 112 is sewn as illustrated in FIG. 2 is wound around resin layer 210a such that a surface of sensor wire 112 on a side opposite to the sensor wire 112 is oriented on a side of resin layer 210a. Note that the surface on the side of sensor wire 112 of base material 111 wound around in this manner is covered with a surface layer formed of leather, wood, resin, or the like. Also, in the exemplary embodiment, base material 111 on which sensor wire 112 is sewn is disposed on, for example, a whole circumference of rim 210. Furthermore, in the exemplary embodiment, although base material 111 is wound around resin layer 210a such that the surface of the base material on the side opposite to sensor wire 112 is oriented on the side of resin layer 210a, base material 111 may be wound around resin layer 210a such that the surface of base material 111 on the side of sensor wire 112 is oriented on the side of resin layer 210a.

Sensor wire 112 disposed on rim 210 forms a capacitance between with metallic core 210b. Herein, when a site of rim 210 on which sensor wire 112 is disposed is gripped by a hand of the driver, a capacitance is formed also between sensor wire 112 and the hand. This enables sensor circuit 122 of control circuit unit 120 to detect a grip of rim 210 by the hand depending on an absolute value or a change amount of the capacitance.

Herein, first wire portion 112a and second wire portion 112b of sensor wire 112 according to the exemplary embodiment will be described in detail.

In the exemplary embodiment, as illustrated in FIG. 2, second wire portion 112b is disposed in outer peripheral corresponding region 111A of base material 111, and first wire portion 112a is disposed in front side corresponding region 111B and rear side corresponding region 111C of base material 111.

Outer peripheral corresponding region 111A is, for example, a region substantially located at a center of base material 111 in the Y-axis direction, and is a region from a negative-side end to a positive-side end of base material 111 in the X-axis direction.

Front side corresponding region 111B is, for example, a region on the positive-side of base material 111 in the Y-axis direction, and is a region from the negative-side end to the positive-side end of base material 111 in the X-axis direction.

Rear side corresponding region 111C is, for example, a region on the negative-side of base material 111 in the Y-axis direction, and a region from the negative-side end to the positive-side end of the base material 111 in the X-axis direction.

Figure 4:
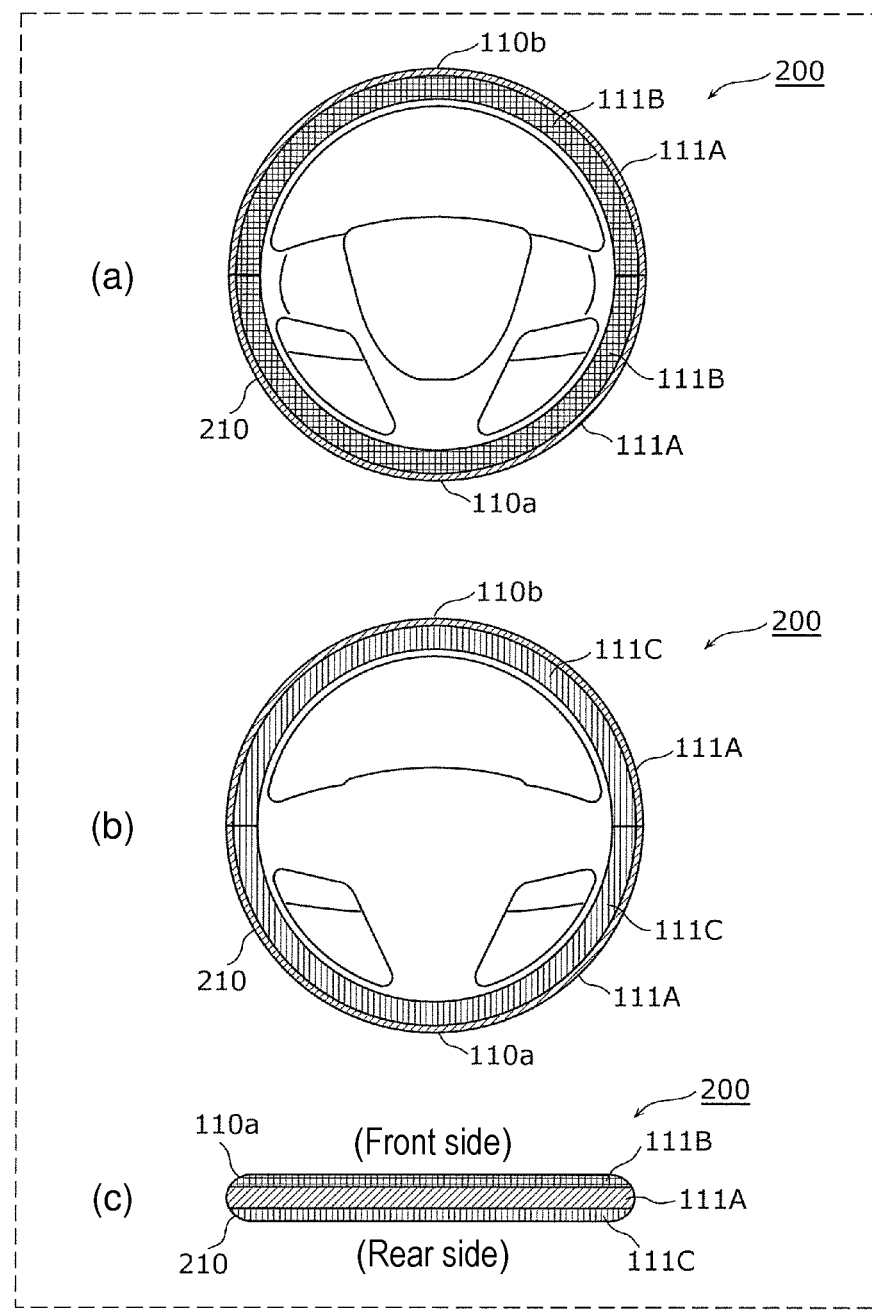
FIG. 4 is a diagram illustrating a state where the sensor is attached to the rim of a steering wheel according to the exemplary embodiment.

FIG. 4 is a diagram illustrating a state where above-mentioned sensor 110 is attached on rim 210 of steering wheel 200. Note that part (a) of FIG. 4 is a front view of steering wheel 200, part (b) of FIG. 4 is a rear view of steering wheel 200, and part (c) of FIG. 4 is a side view (bottom view) of steering wheel 200.

As illustrated in parts (a) to (c) of FIG. 4, first sensor 110a is attached in a lower half region of rim 210, and second senor 110b is attached in an upper half region of rim 210. The lower half region of rim 210 is a half region of rim 210 on a vertically lower side in a state where a steering angle of steering wheel 200 is 0° that is a neutral state, that is, in a state where vehicle 1 travels in a forward direction. In contrast, the lower half region of rim 210 is a half region of rim 210 on a vertical upper side in a state where the steering angle of steering wheel 200 is 0°.

Base materials 111 of respective first sensor 110a and second sensor 110b are disposed along a circumferential direction of a cross-section of rim 210. In this context, front side corresponding region 111B of base material 111 is disposed on the front side of rim 210 as illustrated in parts (a) and (c) of FIG. 4. Also, rear side corresponding region 111C of base material 111 is disposed on the rear side of rim 210 as illustrated in parts (b) and (c) of FIG. 4. Note that, the rear side of rim 210 is a surface on a steering shaft side in the rotation axis direction of steering wheel 200 (positioned near to the steering shaft), and the front side of rim 210 is a surface on a side opposite to the steering shaft in the rotation axis direction of steering wheel 200 (positioned in a direction opposite to the rear side; first direction). Outer peripheral corresponding region 111A of base material 111 is disposed on an outer peripheral surface of rim 210 as illustrated in parts (a) to (c) of FIG. 4. Herein, the outer peripheral surface of rim 210 is a surface on an outermost side in a direction toward sides of rim 210 from the rotation center of steering wheel 200.

Note that harness 130 is connected to sensor end a and power source end b at a position deviated from a center in the X-axis direction of each of base materials 111 of respect first sensor 110a and second sensor 110b as illustrated in FIG. 2. Accordingly, as illustrated in part (a) of FIG. 4, first sensor 110a is disposed at the lower half region of rim 210, so that harness 130 is passed through spork 202 of steering wheel 200 on the lower side to be connected to control circuit unit 120. In contrast, second sensor 110b is disposed on the upper half region of rim 210. Accordingly, harness 130 is passed through near, for example, metallic core 210b, and is passed through any of left or right spoke 202 of steering wheel 200 to be connected to control circuit unit 120.

Figure 5:
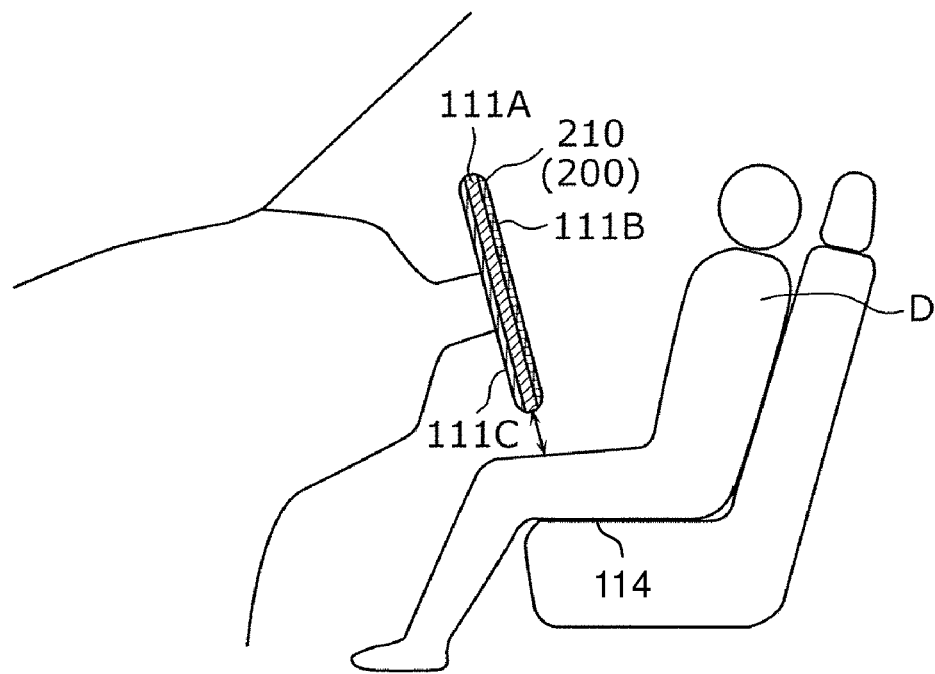
FIG. 5 is a diagram illustrating a positional relation between the rim of the steering wheel and a driver according to the exemplary embodiment.

FIG. 5 is a diagram illustrating a positional relation between rim 210 of steering wheel 200 and the driver.

In a case where vehicle 1 is a passenger vehicle, steering wheel 200 is attached to vehicle 1 such that the front side of rim 210 is oriented to the chest of driver D. Accordingly, outer peripheral corresponding region 111A of base material 111 of sensor 110 attached to rim 210 is disposed to oppose a knee or thigh of driver D. In other words, outer peripheral corresponding region 111A is attached to a site of rim 210 and a leg opposing portion that is a site opposing a knee or thigh of the driver operating steering wheel 200. In contrast, front side corresponding region 111B of base material 111 is made to be oriented on a chest side of driver D, and rear side corresponding region 111C of base material 111 is made to be oriented on a side opposite to the chest of driver D. In other words, front side corresponding region 111B and rear side corresponding region 111C are attached to a non-opposing portion that is a site of rim 210 other than the leg opposing portion. Alternatively, outer peripheral corresponding region 111A is positioned at a seat opposing portion nearer to seat surface 114 than rear side corresponding region 111C and front side corresponding region 111B.

Accordingly, a knee or thigh of driver D may come close to outer peripheral corresponding region 111A. Therefore, in grip sensor 100 according to the exemplary embodiment, second wire portion 112b of sensor wire 112 is formed in outer peripheral corresponding region 111A as illustrated in FIG. 2. In contrast, first wire portion 112a of sensor wire 112 is formed in front side corresponding region 111B and rear side corresponding region 111C.

That is, in the exemplary embodiment, second wire portion 112b is disposed at the leg opposing portion that is a site of rim 210 and that is opposing a knee or thigh of the driver operating steering wheel 200 in a state where base material 111 is attached to rim 210. Furthermore, first wire portion 112a is disposed at the non-opposing portion that is a site of rim 210 other than the leg opposing portion. To be more specific, in the exemplary embodiment, the above-mentioned leg opposing portion is the outer peripheral surface of rim 210 on the outermost side in a direction from the rotation center of steering wheel 200 toward sides of rim 210, and the non-opposing portion includes the front side and rear side of rim 210.

Herein, second wire portion 112b is a wire portion of sensor wire 112 on the side of power source end b, and is away from sensor circuit 122 than first wire portion 112a. In contrast, first wire portion 112a is a wire portion of sensor wire 112 on the side of sensor end a, and is nearer to sensor circuit 122 than second wire portion 112b.

Figure 6:
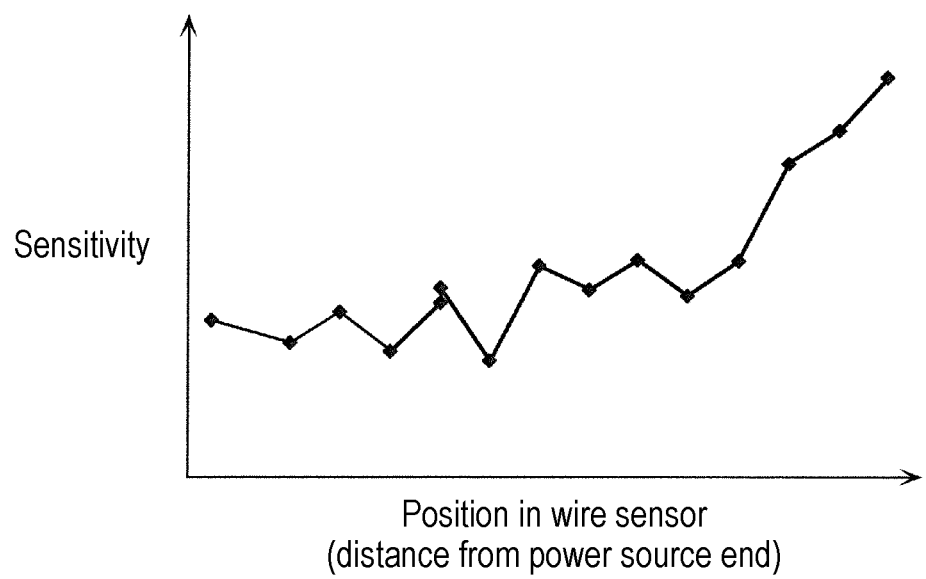
FIG. 6 is a diagram illustrating a relation between a position of a sensor wire and a detection sensitivity of grip at the position.

FIG. 6 is a diagram illustrating a relation between a position of sensor wire 112 and detection sensitivity of grip at the position. Note that a horizontal axis of a graph illustrated in FIG. 6 indicates a position in sensor wire 112. This position is illustrated as a distance from power source end b to a position of sensor wire 112 along it. That is, this position is illustrated as an electrical connection route distance from power source end b or power source unit 121.

As illustrated in FIG. 6, sensitivity of sensor wire 112 at the position becomes high as the distance at the position becomes close to sensor circuit 122, that is, the distance of the position from power source end b becomes long. In contrast, sensitivity of sensor wire 112 at the position becomes low as the distance at the position becomes far from sensor circuit 122, that is, the distance of the position from power source end b becomes short.

That is, second wire portion 112b formed in outer peripheral corresponding region 111A in the exemplary embodiment is nearer to power source end b than first wire portion 112a and away from sensor circuit 122, so that sensitivity in second wire portion 112b is lower than that in first wire portion 112a Accordingly, in the exemplary embodiment, when a knee or thigh of driver D comes close to rim 210 of steering wheel 200, the knee or thigh comes close to outer peripheral corresponding region 111A where second wire portion 112b at which detection sensitivity of grip is low is formed. This makes it possible to suppress that grip by the driver is falsely detected when a knee of thigh of the driver comes close to rim 210.

SUMMARY

As described above, grip sensor 100 according to the exemplary embodiment includes base material 111 attached to rim 210 of steering wheel 200, sensor wire 112 formed on base material 111, and sensor circuit 122 electrically connected to sensor end a of sensor wire 112. Sensor wire 112 includes first wire portion 112a on the side of sensor end a, and second wire portion 112b on the side of power source end b. In a state where base material 111 is attached to rim 210, second wire portion 112b is disposed at the leg opposing portion that is a site of rim 210 and that is a site opposing a knee or thigh of the driver operating steering wheel 200. Also, first wire portion 112a is disposed at the non-opposing portion that is a site of rim 210 other than the leg opposing portion. To be more specific, the above-mentioned leg opposing portion is an outer peripheral surface of rim 210 on the outermost side in a direction from the rotation center of steering wheel 200 toward sides of rim 210, and the non-opposing portion includes the front side and the rear side of rim 210.

This makes second wire portion 112b that is far from sensor circuit 122 in electrical connection route is disposed at the leg opposing portion (that is, outer peripheral surface) of rim 210 of steering wheel 200. This makes it possible to lower detection sensitivity of grip at the leg opposing portion than detection sensitivity at the non-opposing portion (that is, front side and rear side) of rim 210. This makes it possible to suppress that grip of steering wheel 200 by the driver is falsely detected when a knee or thigh of the driver comes close to the leg opposing portion of rim 210.

First Modified

In the above-mentioned exemplary embodiment, although wiring densities of sensor wire 112 disposed in respective outer peripheral corresponding region 111A, front side corresponding region 111B, and rear side corresponding region 111C are same, the wiring densities may be made different. This wiring density is a ratio of area of sensor wire 112 disposed per unit area of base material 111. In the modification, a wiring density of sensor wire 112 in outer peripheral corresponding region 111A is lower than wiring densities in front side corresponding region 111B and rear side corresponding region 111C.

Figure 7:
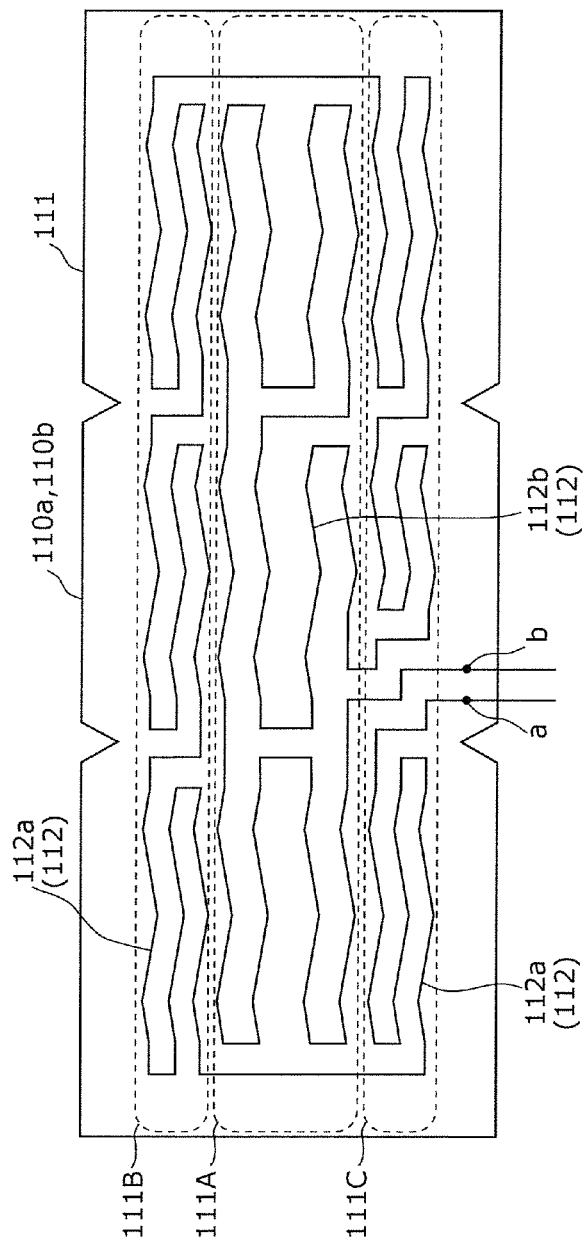
FIG. 7 is a diagram illustrating an example of a first sensor or a second sensor according to a first modification of the exemplary embodiment.

FIG. 7 is a diagram illustrating an example of first sensor 110a or second sensor 110b according to the modification.

As illustrated in FIG. 7, a wiring density of sensor wire 112 in outer peripheral corresponding region 111A is lower than wiring densities in front side corresponding region 111B and rear side corresponding region 111C. In other words, a pattern of sensor wire 112 is rough in outer peripheral corresponding region 111A, and in contrast, dense in front side corresponding region 111B and rear side corresponding region 111C. Alternatively, a distance (pitch)

between a wire and a wire included in sensor wire 112 is long in outer peripheral corresponding region 111A, and short in front side corresponding region 111B and rear side corresponding region 111C.

This makes the wiring density of sensor wire 112 in outer peripheral corresponding region 111A low, making it possible to further suppress sensitivity in outer peripheral corresponding region 111A than sensitivities in front side corresponding region 111B and rear side corresponding region 111C. This makes it possible to further suppress that grip by the driver is falsely detected when a knee or thigh of the driver comes close.

Second Modification

In the above-mentioned exemplary embodiment, although outer peripheral corresponding region 111A in base material 111 is disposed at the leg opposing portion of rim 210, rear side corresponding region 111C may be disposed at the leg opposing portion. In the modification, the leg opposing portion is the rear side of rim 210, and the non-opposing portion includes the front side and the outer peripheral surface of rim 210. The outer peripheral surface is a surface of rim 210 on the most outer side in the direction from the rotation center of steering wheel 200 toward sides of rim 210.

Figure 8:
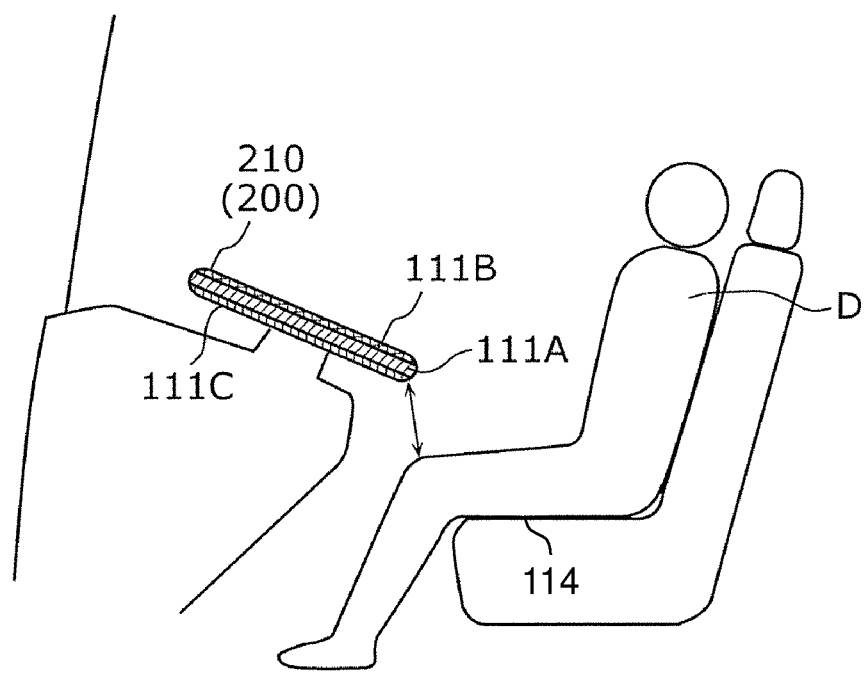
FIG. 8 is a diagram illustrating a positional relation between the rim of the steering wheel and the driver according to a second modification of the exemplary embodiment.

FIG. 8 is a diagram illustrating a positional relation between rim 210 of steering wheel 200 and the driver according to the modification.

When vehicle 1 is a large vehicle such as a truck or a bus, steering wheel 200 is attached to vehicle 1 such that the front side of rim 210 is oriented in a vertically upper direction than in a case where vehicle 1 is a passenger vehicle. Accordingly, in this case, not outer peripheral corresponding region 111A but rear side corresponding region 111C in base material 111 is opposed to a knee or thigh of driver D. In contrast, outer peripheral corresponding region 111A in base material 111 is oriented on a side of an abdomen of driver D, and front side corresponding region 111B in base material 111 is oriented in a vertically upper direction. Alternatively, in base material 111, rear side corresponding region 111C is located at the seat opposing portion nearer to seat surface 114 than outer peripheral corresponding region 111A and front side corresponding region 111B.

Accordingly, in a case where vehicle 1 is a large vehicle, a knee or thigh of the driver comes close to rear side corresponding region 111C. Therefore, in the grip sensor 100 according to the modification, second wire portion 112b of sensor wire 112 is formed in rear side corresponding region 111C, and first wire portion 112a of sensor wire 112 is formed in outer peripheral corresponding region 111A and front side corresponding region 111B.

Herein, second wire portion 112b is a wire portion of sensor wire 112 on the side of power source end b like in the first exemplary embodiment, and is away from sensor circuit 122 than first wire portion 112a. That is, as illustrated in FIG. 6, second wire portion 112b is close to power source end b and away from sensor circuit 122, so that sensitivity in second wire portion 112b is lower than that in first wire portion 112a. In the modification, the second wire portion 112b is disposed in rear side corresponding region 111C.

Accordingly, in the modification, even when vehicle 1 is a large vehicle, second wire portion 112b in which detection sensitivity of grip is low is formed in rear side corresponding region 111C to which a knee or thigh of driver D comes close. This makes it possible to suppress that grip by the driver is falsely detected when a knee or thigh of the driver comes close to rim 210.

Third Modification

In the above-mentioned exemplary embodiment, control circuit unit 120 of grip sensor 100 includes power source unit 121. However, control circuit unit 120 may not include power source unit 121.

Figure 9:
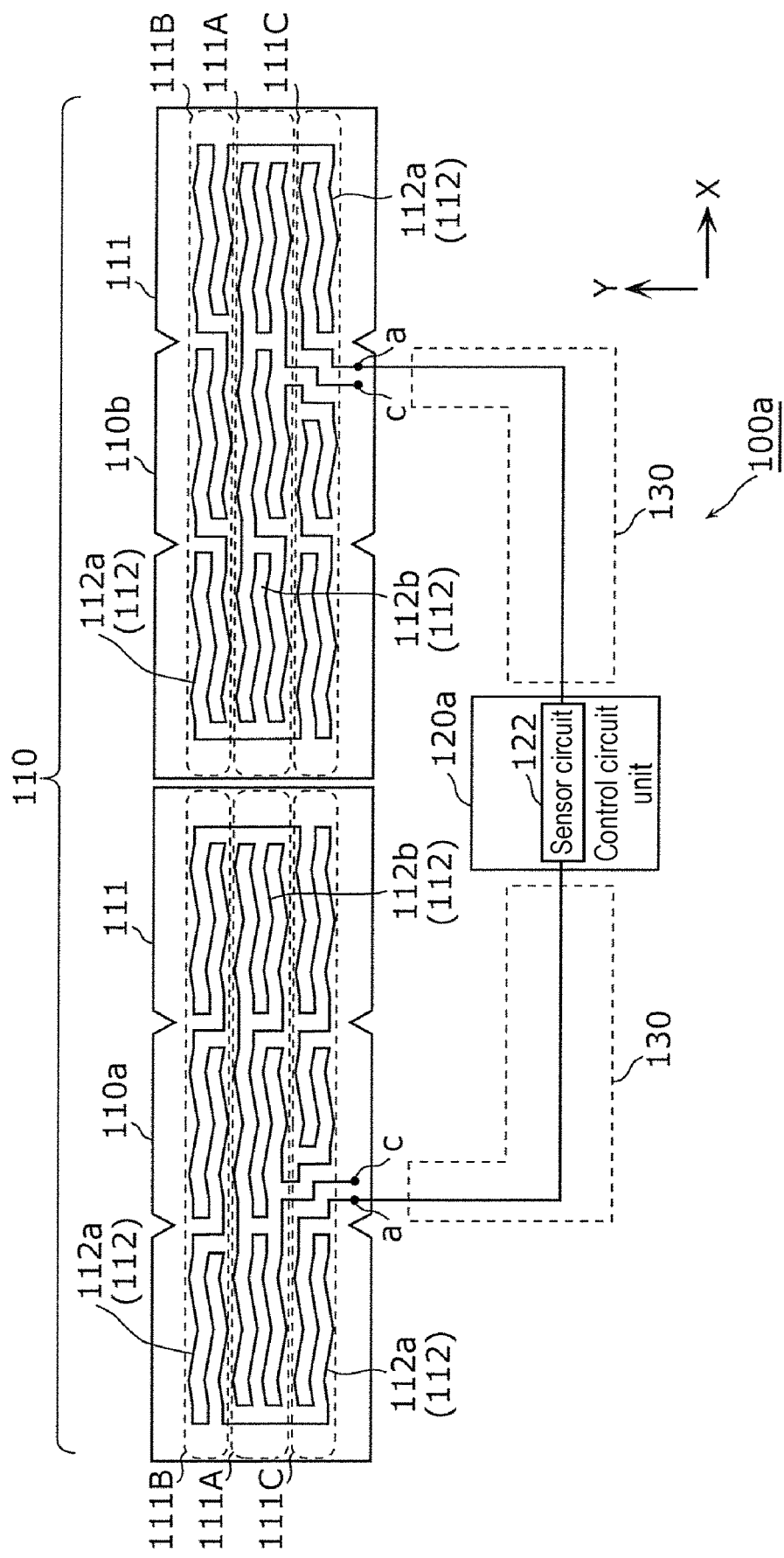
FIG. 9 is a diagram illustrating a configuration example of a grip sensor according to a third modification of the exemplary embodiment.

FIG. 9 is a diagram illustrating a configuration example of a grip sensor according to the modification.

Grip sensor 100a according to the modification includes control circuit unit 120a instead of control circuit unit 120. This control circuit unit 120a includes no power source unit 121. Accordingly, an end c of sensor wire 112 on a side opposite to sensor end a is not connected to power source unit 121 to be opened. In this case, grip sensor 100a has no function as a heater that heats sensor wire 112 to warn rim 210 of steering wheel 200. However, such grip sensor 100a is also capable of exerting the same effect as that in the above-mentioned exemplary embodiment.

Fourth Modification

In the above-mentioned exemplary embodiment, second wire portion 112b far from sensor circuit 122 in electrical connection route is disposed in outer peripheral corresponding region 111A to make sensitivity of second wire portion 112b low. In the modification, second wire portion 112b far from sensor circuit 122 in electrical connection route is disposed at the leg opposing portion in a state where steering wheel 200 is at a neutral position across an outer circumference of cross-section of rim 210.

Figure 10:
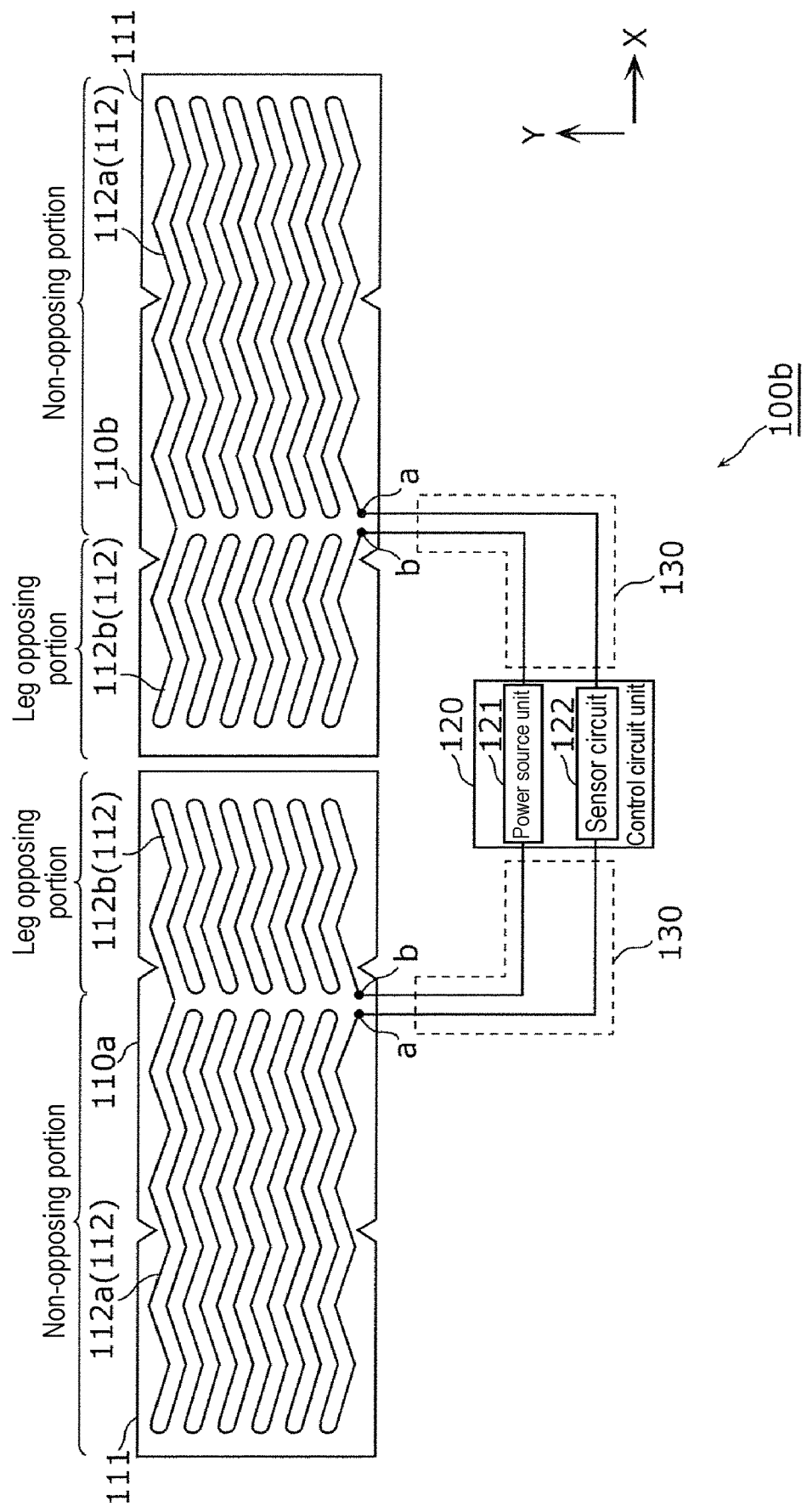
FIG. 10 is a diagram illustrating a configuration example of a grip sensor according to a fourth modification of the exemplary embodiment.

FIG. 10 is a diagram illustrating an example of first sensor 110a or second sensor 110b according to the modification.

In the grip sensor 100b according to the modification, as illustrated in FIG. 10, in first sensor 110a, second wire portion 112b is formed in a region of about one third from the positive-side end in the X-axis direction of base material 111 (leg opposing portion) across the Y-axis direction. In second sensor 110b, second wire portion 112b is formed in a region of about one third from the negative-side end in the X-axis direction of base material 111 (leg opposing portion) across the Y-axis direction. In any of first sensor 110a and second sensor 110b, first wire portion 112a is formed in another region of base material 111 across the Y-axis direction. Note that first wire portion 112a and second wire portion 112b have a substantially identical wiring density.

Such first sensor 110a and second sensor 110b are disposed along the circumferential direction of respective cross-sections of rim 210 such that a portion of base material 111 on which second wire portion 112b is formed is positioned on the vertically lower side of rim 210. Accordingly, second wire portion 112b is to be disposed at the leg opposing portion in a state where steering wheel 200 is at the neutral position across the outer circumference of cross-section of rim 210. This configuration makes first sensor 110a and second sensor 110b be respectively disposed at a right half and a left half of steering wheel 200.

Disposing first sensor 110a and second sensor 110b in this manner makes second wire portion 112b far from sensor circuit 122 in electrical connection route to have low detection sensitivity be positioned at the leg opposing portion in a state where steering wheel 200 is at the neutral position across the outer circumference of cross-section of the portion of rim 210. Accordingly, even when a knee or thigh of driver D comes close to the leg opposing portion of steering wheel 200, detection sensitivity in second wire portion 112b disposed at the leg opposing portion is low, making it possible to suppress that grip by the driver D is falsely detected.

Note that, when driver D steers steering wheel 200 to steer the vehicle, first wire portion 112a having a high detection sensitivity is positioned on the vertically lower side of rim 210, coming close of a knee or thigh of driver D can be detected. However, when the vehicle is steered, driver D grips steering 200, so that it is enough that, for example, control circuit unit 120 is made to ignore or deactivate change of capacitance of first wire portion 112a by detecting that the vehicle is steered from an output from a steering sensor provided on the steering wheel 200.

Also, in the modification, as illustrated in FIG. 10, although sensor wire 112 is formed on base material 111 to mainly extend in the X-axis direction, this configuration is not limited thereto, and sensor wire 112 may be formed on base material 111 to mainly extend in the Y-axis direction.

Other Modifications

The grip sensor according to one or more aspects has been described above on the basis of the exemplary embodiment and its modifications. However, the present invention is not limited to the exemplary embodiment and its modifications. Configurations in which various modifications conceived by those skilled in the art are applied to the exemplary embodiment and its modifications, and configurations established by combining constituent elements in different modifications may also fall within the scope of the present invention without departing from the spirit of the present invention.

For example, although sensor wire 112 is formed of a metal wire in the above-mentioned exemplary embodiment and its modifications, sensor wire 112 may be formed of a metal foil, a conductive sheet, or the like having a substantially constant width. Also, sensor wire 112 may be formed by any material as long as it has conductivity, and the material is not limited to a metal.

In the above-mentioned exemplary embodiment and its modifications, each of first wire portion 112a and second wire portion 112b of sensor wire 112 is formed in a zigzag shape, but the shape is not limited thereto, and any shape may be employed.

Also, in the above-mentioned exemplary embodiment and its modifications, grip by a hand of the driver is detected, but grip by a hand of a person other than the driver may be detected.

Also, in the above-mentioned exemplary embodiment and its modifications, front side corresponding region 111B is positioned on the positive-side of base material 111 in the Y-axis direction, and rear side corresponding region 111C is positioned on the negative-side of base material 111 in the Y-axis direction. However, front side corresponding region 111B may be positioned on the negative-side of base material 111 in the Y-axis direction, and rear side corresponding region 111C may be positioned on the positive-side of base material 111 in the Y-axis direction in an opposite manner. Also in this case, front side corresponding region 111B is disposed on the front side of rim 210, and rear side corresponding region 111C is disposed on the rear side of rim 210. Herein, a site of first wire portion 112a on the side of sensor end a may be formed in front side corresponding region 111B on the negative-side of base material 111 in the Y-axis direction, and a site of first wire portion 112a on the side of power source end b may be formed in rear side corresponding region 111C on the positive-side of base material 111 in the Y-axis direction. This makes it possible to enhance sensitivity on the front side than sensitivity on the rear side of rim 210.

In the above-mentioned exemplary embodiment and its modifications, sensor 110 is formed of two separated first sensor 110a and second sensor 110b, but they may be integrally formed, or sensor 110 may include three or more separated units. In the exemplary embodiment and its modifications, first sensor 110a and second sensor 110b have substantially same configuration, but they may have different configurations with each other. For example, a possibility is low that a knee or thigh of the driver comes close to second sensor 110b attached in the upper half region of rim 210, so that second sensor 110b may have a configuration different from the configuration illustrated in FIG. 2. That is, in second sensor 110b, second wire portion 112b on the side of power source end b may not be disposed in outer peripheral corresponding region 111A of base material 111.

In the above-mentioned exemplary embodiment and its modifications, although harness 130 and control circuit unit 120 is embedded in spoke 202 on the left side in FIG. 1, this configuration is not limited thereto, and harness 130 and control circuit unit 120 may be embedded in spork 202 on the right side or lower side. Also, harness 130 is not limited to be embedded in one spork 202, and for example, harnesses 130 of first sensor 110a and second sensor 110b may be embedded in respective different sporks 202.

INDUSTRIAL APPLICABILITY

The grip sensor of the present invention has an advantageous effect that false detection can be suppressed, and is applicable to, for example, a steering wheel of a vehicle, and the like.

REFERENCE MARKS IN THE DRAWINGS

1: vehicle
100, 100a, 100b: grip sensor
110, 110a, 110b: sensor
111: base material
111A: outer peripheral corresponding region
111B: front side corresponding region
111C: rear side corresponding region
112: sensor wire
112a: first wire portion
112b: second wire portion
114: seat surface
120, 120a: control circuit unit
121: power source unit
122: sensor circuit
130: harness
200: steering wheel
201: rim
202: spoke
203: horn switch cover
210: rim
210a: resin layer
210b: metallic core
301: speaker
302: display device
a: sensor end
b: power source end

The invention claimed is:
1. A grip sensor comprising:
a base material;

a sensor wire; and
a sensor circuit,
wherein
the base material is attached on a rim of a steering wheel,
the sensor wire is disposed on the base material and includes a first end and a second end positioned to oppose the first end,
the sensor circuit is electrically connected to the first end of the sensor wire,
the sensor wire includes a first wire portion and a second wire portion, the second wire portion being positioned on a direction of the second end with respect to the first wire portion,
the first wire portion and the second wire portion are connected in series, and
in a state where the steering wheel is attached to a vehicle and a steering angle of the steering wheel is neutral;
the second wire portion is disposed at a seat surface opposing portion of the rim that opposes a seat surface of a seat of the vehicle, the first wire portion is disposed at a non-opposing portion of the rim that is further from the seat surface than the seat surface opposing portion, the second wire portion is disposed farther from the sensor circuit than the first wire portion in an electrical connection route from the sensor circuit, and the sensor circuit is connected to the first end of the first wire portion; and
the non-opposing portion of the rim is different than the seat surface opposing portion.

2. The grip sensor according to claim 1, wherein
the rim includes a front side positioned in a first direction parallel to a rotational axis of the steering wheel and a rear side positioned in a direction opposite to the first direction,
the seat surface opposing portion is disposed on an outer peripheral surface positioned on an outermost side of the rim in a direction from a rotational center of the steering wheel toward sides of the rim, and
the non-opposing portion includes the front side and the rear side of the rim.

3. The grip sensor according to claim 1, wherein
the rim includes a front side positioned in a first direction parallel to a rotational axis of the steering wheel and a rear side positioned in a direction opposite to the first direction,
the seat surface opposing portion is disposed on the rear side of the rim, and
the non-opposing portion includes the front side of the rim and an outer peripheral surface positioned on an outermost side of the rim in a direction from a rotational center of the steering wheel toward sides of the rim.

4. The grip sensor according to claim 1, wherein
the second wire portion is disposed at the seat surface opposing portion in the state where the steering wheel is neutral across an outer circumference of a cross-section of the rim parallel to a rotational axis of the steering wheel.

5. The grip sensor according to claim 1, wherein each of the first wire portion and the second wire portion is disposed on the base material in a zigzag manner.

6. The grip sensor according to claim 1, further comprising
a power source that is electrically connected to the second end of the sensor wire and that heats the sensor wire by making current flow in the sensor wire.

7. A steering wheel including the grip sensor according to claim 1.

8. A vehicle including the steering wheel according to claim 7.

* * * * *